June 23, 1964  A. H. MARK ETAL  3,138,218
HYDRAULIC TRANSMISSION CONTROL AND STEERING SYSTEM
Filed April 3, 1962

INVENTORS.
ALEXANDER HING MARK &
BY JOHN J. DENOVAN
Wolfe, Hubbard, Voit & Osann
ATTORNEYS.

United States Patent Office
3,138,218
Patented June 23, 1964

3,138,218
HYDRAULIC TRANSMISSION CONTROL AND STEERING SYSTEM
Alexander Hing Mark, Livonia, Mich., and John J. Donovan, Oldcastle, Ontario, Canada, assignors to Massey-Ferguson Inc., Detroit, Mich., a corporation of Maryland
Filed Apr. 3, 1962, Ser. No. 184,832
2 Claims. (Cl. 180—6.3)

This invention relates to hydraulic transmissions for a vehicle and, more particularly, to a valve control system particularly adapting such transmissions for tractor use.

It is an object of the invention to provide a valve control system for hydraulic transmissions that gives a differential lock action under both driving and breaking conditions. That is, neither drive wheel is permitted to spin freely at the expense of loss of power at the other drive wheel, and this differential action is maintained while coasting or braking as well as driving.

A collateral object is to provide a system of the above character with free-differential selection permitting the operator to disable the differential locking effect when desired, as for high speed travel on paved roads.

Another object is to provide a valve control system of the type referred to above with a steering control which overrides the differential locking action to give power assisted turning by supplying unequal power to the drive wheels. In other words, the wheel at the outside of the turn receives greater power than the inside wheel, with the power difference being proportional to the sharpness of the turn desired.

A further object is to provide a control system as characterized above that is rugged and reliable so as to be well suited for agricultural tractors. It is a detailed, and related, object to provide a positive displacement positioning device for the main dividing or differential valve so as to insure proper operation without shock or vibration effects.

Figure 1:
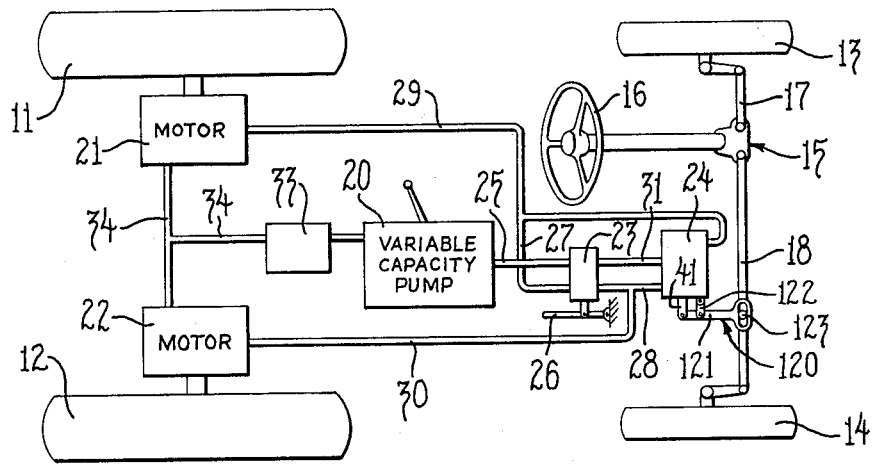
Figure 2:
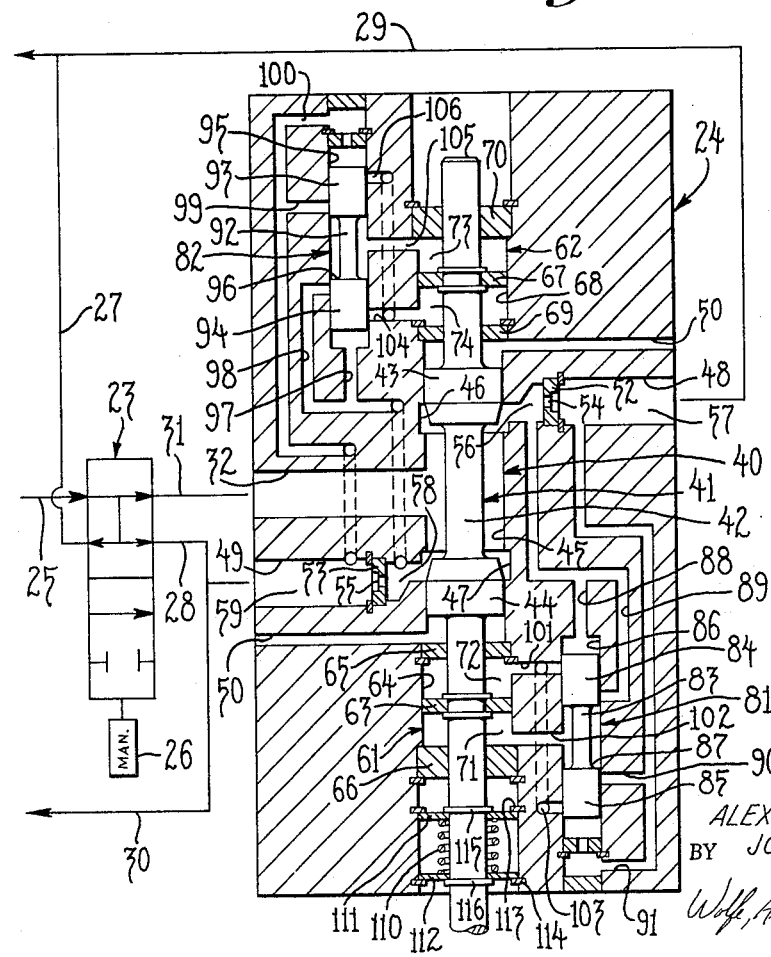

Other objects and advantages of the invention will become apparent upon reading the following detailed description and upon reference to the drawings, in which:

FIGURE 1 is a schematic view of a vehicle embodying a control system of the present invention; and FIG. 2 is an enlarged, partially diagrammatic, section of a portion of the control system shown in FIG. 1.

While the invention will be described in connection with a preferred embodiment, it will be understood that we do not intend to limit the invention to that embodiment. On the contrary, we intend to cover all alternatives, modifications and equivalents as may be included within the spirit and scope of the invention as defined by the appended claims.

Turning first to FIGURE 1, a vehicle is schematically shown having a hydraulic transmission control system embodying the invention. The vehicle includes a pair of rear drive wheels 11 and 12 and front steerable wheels 13 and 14. A steering mechanism 15 controls the wheels 13, 14 and includes a steering wheel 16 and shiftable steering rods 17 and 18.

The vehicle is provided with a hydraulic transmission which includes a variable capacity pump 20 arranged to control the flow of fluid to individual positive displacement fluid motors 21 and 22 which are in driving engagement with the respective drive wheels 11, 12.

In keeping with the invention, a selector valve 23 and a differential valve assembly 24 are interposed between the pump 20 and the motors 21, 22. The output of the pump 20 is directed through a pump output line 25 to the selector valve 23 which is a two-position, manually operated valve having a control handle 26.

In one position of the selector valve 23, fluid from the pump output line 25 is directed through connecting lines 27 and 28 to respective motor input lines 29 and 30 (see also FIG. 2). Operation of the handle 26 so as to shift the selector valve 23 into its second position causes the lines 27, 28 to be blocked and the fluid output from the pump 20 to be directed from the line 25 through a line 31 to an input passage 32 formed in the valve assembly 24. FIG. 2 shows the selector valve 23 in its first above-described position, with upward movement of the schematically illustrated valve block being required to shift the valve into its second above-described position.

The pump 20 draws fluid from a sump or reservoir 33 and return lines 34 are extended from the motors 21, 22 to the reservoir 33.

Pursuant to the invention, the differential valve assembly 24 includes a dividing valve 40 to proportion fluid from the pump 20 to the respective drive motor lines 29, 30, and the assembly also includes controls for the dividing valve 40 which are effective to provide a differential locking action. The illustrated dividing valve includes a valve element 41 in the form of a spool having a stem 42 carrying a pair of cylindrical, spaced lands 43 and 44 slidably fitted in a valve bore 45. The input passage 32 opens to the center of the bore 45 and a pair of port grooves 46 and 47 open the opposite ends of the bore 45 to output passages 48 and 49. The output passage 48 is connected to the line 29 which feeds oil to the motor 21, and the output passage 49 is connected to the line 30 which supplies oil to the motor 22.

With the valve element 41 in its neutral position, illustrated in FIG. 2, the lands 43, 44, which preferably have opposed conical tapered portions, partially restrict fluid flow between the input passage 32 and both output passages 48, 49. It will be seen that downward shifting movement of the element 41 tends to close the port groove 46, so as to further restrict fluid flow between the passages 32 and 48, while simultaneously opening the port groove 47, so as to permit an increased fluid flow between the passages 32, 49. Upward shifting movement of the element 41 has the reverse effect with the flow between the passage 32 and the passage 49 being further restricted while the flow between the passage 32 and the passage 48 is facilitated. Preferably, a pair of relief ports 50 are provided to drain fluid leaking above the land 43 and below the land 44.

To sense the operation of the motors 21, 22, a pair of plugs 52 and 53 are fixed in the respective output passages 48, 49 and are provided with central apertures defining fluid orifices 54 and 55, respectively. Fluid flowing through the passages 48, 49 must pass through the respective orifices 54, 55 so as to create a pressure differential across the orifices. In other words, when fluid is flowing from the passage 32 through the passages 48, 49, a region 56 on the upstream side of the orifice 54 will contain a greater fluid pressure than a region 57 on the downstream side of this orifice. Similarly, a region 58 on the upstream side of the orifice 55 will contain fluid under greater pressure than a region 59 on the downstream side of the orifice 55. These pressure differences exist when the pump 20 is supplying fluid under pressure to the motors 21, 22 so as to drive the vehicle in a forward direction.

For controlling the valve element 41 so as to produce a differential lock action, a pair of double acting actuators 61 and 62 are arranged to be responsive to the pressure drops across the orifices 54, 55, respectively, and to exert shifting forces on the valve element 41 that are proportional to the pressure drops being sensed. The actuator 61 includes a piston 63 secured to the stem 42 and fitted in a cylindrical bore 64 between end walls 65 and 66. The actuator 62 is similarly constructed with a piston 67 being slidably fitted within a bore 68 between end walls 69 and 70. The actuator 61 thus includes a chamber 71 on the underside of the piston 63 and a chamber 72 on the opposite side of the piston 63, while the actuator 62 includes a chamber 73 on the upper side of the piston 67 and a chamber 74 on the opposite side of this piston.

In carrying out the invention, relay valves 81 and 82 are interposed between the respective actuators 61, 62 and the output passages 48, 49 so that a pressure drop across the orifices 54, 55 causes shifting forces to be exerted on the valve element 41 to further restrict fluid flow through the passage in which the pressure drop occurs. Furthermore, these forces are developed without regard to the direction of fluid flow through the orifices. In the illustrated construction, the relay valve 81 includes a spool 83 having cylindrical spaced lands 84 and 85 slidably mounted in a bore 86 and separated by a stem groove 87. A pair of passages 88 and 89 place the relay valve bore 86 in fluid communication with the region 56 at one side of the orifice 54, and a second pair of passages 90 and 91 place the valve bore 86 in communication with the region 57 on the opposite side of the orifice 54.

The relay valve 82 is constructed similarly to the valve 81 and includes a spool 92 having spaced cylindrical lands 93 and 94 slidably fitted in a bore 95 and spaced by a stem groove 96. A pair of passages 97 and 98 place the bore 95 in communication with the region 58 at one side of the orifice 55, and a second pair of passages 99 and 100 place the bore 95 in communication with the region 59 on the opposite side of the orifice 55.

The operation of the relay valve 81 can be seen by assuming a pressure drop across the orifice 54 such that the region 56 contains fluid at a higher pressure than the region 57. As a result of this condition, fluid pressure through the passage 88 against the upper end of the relay valve spool 83, as seen in FIG. 2, will exceed the pressure developed on the lower end of the spool by fluid admitted through the passage 91. As a result, the spool 83 shifts downwardly so that fluid from the passage 88 is transmitted through a passage 101 into the chamber 72 above the actuator piston 63. At the same time, fluid from the region 57 is transmitted by the passage 90 through the stem groove 87 and a passage 102 to the chamber 71 on the underside of the piston 63. Since a pressure differential has been assumed to exist between the regions 56 and 57 on opposite sides of the orifice 54, that same pressure differential will exist between the chambers 71 and 72, with pressure in the chamber 72 exceeding that in the chamber 71. As a result, a force is developed urging the dividing valve element 41 downwardly in FIG. 2 so as to further restrict the port groove 46.

If the pressure drop across the orifice 54 is reversed and the pressure in the region 57 exceeds the pressure in the region 56, then the fluid pressure acting on the bottom of the relay valve spool 83 through the passage 91 will exceed the pressure developed on the upper side of the relay valve stem by fluid being passed through the passage 88. As a result, the valve spool 83 shifts upwardly so that fluid from the region 57 passes through the passage 91 and a passage 103 to the chamber 72 above the piston 63. Fluid from the region 56 is directed through the passage 89, the stem groove 87 and the passage 102 to the chamber 71 on the underside of the piston 63. Since it has been assumed that the region 57 contains fluid at a greater pressure than the region 56, it will be seen that under these conditions there is again developed in the chamber 72 a greater fluid pressure than that existing in the chamber 71 so that a shifting force is exerted on the valve element 41 tending to further restrict the opening of the port groove 46.

Thus, through the action of the relay valve 81, a pressure drop across the orifice 54 in either direction creates a force tending to shift the valve element 41 so as to further restrict the flow of fluid in the passage 48.

Since the shifting force is created by the difference in pressures on opposite sides of the orifice 54, through the double acting actuator 61, this force is directly proportional to the pressure drop across the orifice.

It can be readily seen that the relay valve 82 functions in a manner corresponding to that described in connection with the valve 81. That is, if the pressure in the region 58 exceeds the pressure in the region 59, the relay valve spool 92 is shifted upwardly in FIG. 2 so that the fluid directed through a passage 104 to the chamber 74 is under a higher pressure than the fluid directed through a passage 105 to the chamber 73. Conversely, if the pressure drop across the orifice 55 exists in the opposite direction, with the pressure in the region 59 exceeding the pressure in the region 58, the relay valve stem 92 shifts downwardly in FIG. 2 so that the higher pressure fluid is directed through a passage 106 to the chamber 74 while the lower pressure fluid is directed through the passage 105 to the chamber 73. In each case, a force is developed by the actuator 62 tending to shift the dividing valve element 41 upwardly in a direction that further restricts the port groove 47 so as to further limit the flow of fluid in the passage 49.

Preferably, the valve element 41 is resiliently held in its neutral position, illustrated in FIG. 2, by a compressed spring 110 which surrounds one end of the stem 42 and bears against a pair of washers 111 and 112. The washers 111, 112 are slidably fitted on the valve stem 42 and bear on snap rings 113 and 114, respectively, secured in the bore 45, and on a second set of snap rings 115 and 116, respectively, secured to the valve stem 42. It can thus be seen that downward movement of the valve element 41 draws the washer 111 away from the snap ring 113 and compresses the spring 110 so that a restoring force is exerted tending to return the valve element to its neutral position. Conversely, upward movement of the valve element moves the washer 112 away from the snap ring 114 and again compresses the spring 110 so that an oppositely directed restoring force is exerted on the valve element.

The operation of a hydraulic system including the differential valve assembly 24 can now be readily appreciated. With the selector valve 23 in the position illustrated in FIG. 2, fluid is passed directly from the pump output line 25 to the motor lines 29, 30 so that the differential valve assembly 24 is effectively by-passed. As a result, a free differential action between the drive wheels 11 and 12 can be obtained. In an agricultural tractor, this condition of operation is siutable for high-speed, highway travel.

Upon shifting the selector valve 23 to its second position, the entire output of the pump 20 is directed to the input passage 32 in the differential valve assembly 24. With the dividing valve element 41 held by the spring 110 in its neutral position, equal amounts of fluid are passed from the input passage 32 to each of the output passages 48, 49 so that each drive wheel is powered equally. This flow of fluid creates pressure drops across the orifices 54, 55, with the regions 56 and 58 maintaining fluid at a higher pressure than the downstream regions 57 and 59. As a result, the spool 83 of the relay valve 81 is shifted downwardly, as seen in FIG. 2, and the spool 92 of the relay valve 82 is shifted upwardly so that the actuator 61 exerts a downward force on the dividing valve element 41 while the actuator 62 exerts an upward force on the valve element. Since the shifting forces are proportional to the pressure drops across the orifices 54, 55, and since equal amounts of fluid are being passed through the output passages 48, 49, the oppositely acting shifting forces exerted by the actuators 61, 62 cancel out and the valve element 41 is maintained in its neutral position.

To illustrate the differential lock action, it will be assumed that the left drive wheel 11 begins to slip and lose traction so that the wheel turns freely without subtracting substantial power from the motor 21. As a result, there is a drop in pressure in the line 29 and the region 57, with the further result that a pressure drop of greater magnitude exists across the orifice 54 than existed when the wheel 11 was driving. Since the force exerted by the actuator 61 is proportional to the pressure drop across the orifice 54, the sudden increase in this pressure drop causes an increase in the shifting force developed by the actuator 61, with the result that the counter force exerted by the actuator 62 is overcome and the dividing valve element 41 is shifted downwardly as seen in FIG. 2. This causes the land 43 to further restrict the port groove 46 and cut down the flow of fluid on the passage 32 to the passage 48. Simultaneously, the land 44 further opens the port groove 47 and allows a greater amount of fluid to pass through the passage 49 to the still-driving wheel 12. As a result of this change in the division of fluid from the pump 20 to the two motors 21, 22, power is not wasted at the slipping wheel but rather is directed to the opposite driving wheel thus creating a differential lock action.

It will be understood, of course, that should the wheel 12 slip and lose traction, the valve element 41 will shift upwardly so as to subtract fluid from the motor 22 and increase the power diverted to the motor 21.

It will be plain that skidding or locking up of the wheel 12 while the wheel 11 continues to brake produces a reversed differential locking action.

As a further feature of the invention, a lost motion linkage 120 couples the steering mechanism 15 and the dividing valve element 41 so that shifting the steering mechanism to turn the wheels 13, 14 directs a greater proportion of fluid to the drive wheel that is at the outside of the turn. This results in a form of power assisted steering. In the illustrated construction, the linkage 120 includes a lever 121 pivoted at one end to the valve element 41 and anchored through a short pivoted link 122 to the assembly 24. A pin and slot connection 123 couples the opposite end of the lever 121 to the steering rod 18.

The pin and slot, lost motion connection 123 permits slight steadying movements of the steering mechanism 15 to be made without affecting the differential valve assembly 24. Thus, there is no attempt to introduce power assisted steering until a substantial turn is undertaken. However, operation of the steering mechanism 15 so as to turn the wheels 13, 14 in the proper direction for a right-hand turn swings the lever 121 clockwise, as seen in FIG. 1, so as to shift the valve element 41 upwardly as seen in FIG. 2. This opens the port groove 46 and further restricts the port groove 47 so that a greater amount of fluid is directed to the motor 21 while the motor 22 receives less fluid. The left-hand drive wheel 11, at the outside of the turn, therefore exerts greater power than the right-hand wheel 12 with the result that the right-hand turn of the vehicle is power assisted. Obviously, reverse movement of the steering mechanism 15 so as to turn relatively sharply to the left causes the right-hand wheel 12 to drive with greater power than the left-hand wheel 11.

We claim as our invention:

1. In a vehicle having a shiftable steering wheel mechanism and a hydraulic transmission including a pump and a pair of fluid motors driving respective ones of a pair of drive wheels, the combination comprising, a differential valve having an input line coupled to the output of said pump and a pair of output lines coupled respectively to said fluid motors, said differential valve having a dividing valve and control elements therefor to proportion fluid between said fluid motors and prevent unrestricted relative rotation of said wheels, and a linkage coupling said steering mechanism and said dividing valve so that shifting of the steering mechanism to turn the vehicle positions the dividing valve to direct a greater proportion of fluid to the drive wheel at the outside of the turn, said linkage including a lost motion connection preventing slight shifts of the steering mechanism from affecting said dividing valve.

2. In a vehicle having a shiftable steering wheel mechanism and a hydraulic transmission including a pump and a pair of fluid motors driving respective ones of a pair of drive wheels, the combination comprising, a differential valve having an input line coupled to the output of said pump and a pair of output lines coupled respectively to said fluid motors, said differential valve having a dividing valve and control elements therefor to proportion fluid between said fluid motors and prevent unrestricted relative rotation of said wheels, a linkage coupling said steering mechanism and said dividing valve so that shifting of the steering mechanism to turn the vehicle positions the dividing valve to direct a greater proportion of fluid to the drive wheel at the outside of the turn, said linkage including a lost motion connection preventing slight shifts of the steering mechanism from affecting said dividing valve and a selector valve interposed between said differential valve and said pump and being in fluid communication with said motors, said selector valve being shiftable between a first position wherein fluid is directed from said pump to said motors so as to by-pass said differential valve and a second position wherein the pump output is directed to said differential valve.

References Cited in the file of this patent

UNITED STATES PATENTS

| | | |
|---|---|---|
| 1,176,307 | Manly | Mar. 21, 1916 |
| 2,374,630 | Tucker | Apr. 24, 1945 |
| 2,431,719 | Wilkin | Dec. 2, 1947 |
| 2,602,298 | Ashton | July 8, 1952 |
| 2,651,377 | Lapsley et al. | Sept. 8, 1953 |
| 2,711,077 | Adams | June 21, 1955 |
| 2,774,434 | Ferris | Dec. 18, 1956 |
| 2,807,935 | Lapsley | Oct. 1, 1957 |
| 2,949,971 | Cline | Aug. 23, 1960 |